(12) United States Patent
Ramezani

(10) Patent No.: US 10,017,325 B2
(45) Date of Patent: Jul. 10, 2018

(54) HOLLOW SHAFT DIRECT DRIVE MOTOR

(71) Applicant: Kamran Ramezani, La Jolla, CA (US)

(72) Inventor: Kamran Ramezani, La Jolla, CA (US)

( * ) Notice: Subject to any disclaimer, the term of this patent is extended or adjusted under 35 U.S.C. 154(b) by 0 days.

(21) Appl. No.: 15/459,649

(22) Filed: Mar. 15, 2017

(65) Prior Publication Data

US 2017/0267459 A1    Sep. 21, 2017

Related U.S. Application Data

(60) Provisional application No. 62/317,624, filed on Apr. 3, 2016, provisional application No. 62/311,379, filed on Mar. 21, 2016.

(51) Int. Cl.
| | |
|---|---|
| *B65G 39/02* | (2006.01) |
| *B65G 13/07* | (2006.01) |
| *B65G 13/06* | (2006.01) |
| *B65G 39/12* | (2006.01) |

(52) U.S. Cl.
CPC ............ *B65G 13/06* (2013.01); *B65G 13/07* (2013.01); *B65G 39/12* (2013.01)

(58) Field of Classification Search
None
See application file for complete search history.

(56) References Cited

U.S. PATENT DOCUMENTS

| | | | | |
|---|---|---|---|---|
| 3,918,574 A | | 11/1975 | Allison | |
| 3,971,147 A | * | 7/1976 | Hyler | E02F 3/6454 198/834 |
| 5,442,248 A | * | 8/1995 | Agnoff | B65G 23/08 310/67 R |
| 7,537,107 B2 | * | 5/2009 | Hall | B65G 13/07 198/781.03 |
| 9,004,263 B2 | * | 4/2015 | Hall | B65G 43/00 198/571 |
| 2009/0230791 A1 | * | 9/2009 | Scharfenberg | H02K 7/1025 310/62 |
| 2013/0134017 A1 | | 5/2013 | Hall et al. | |

FOREIGN PATENT DOCUMENTS

| | | |
|---|---|---|
| EP | 1086522 A1 | 3/2001 |
| WO | 99/65134 A1 | 12/1999 |

* cited by examiner

*Primary Examiner* — Kavel Singh
(74) *Attorney, Agent, or Firm* — The Dobrusin Law Firm, PC

(57) ABSTRACT

A conveyor system comprising: (a) one or more motors, (b) one or more transfer devices; (c) a plurality or rollers including: (i) one or more master rollers, the one or more master rollers being directly connected to the one or more motors so that the one or more master rollers are directly driven by the one or more motors; and (ii) one or more slave rollers in communication with the one or more master rollers by the one or more transfer devices.

20 Claims, 7 Drawing Sheets

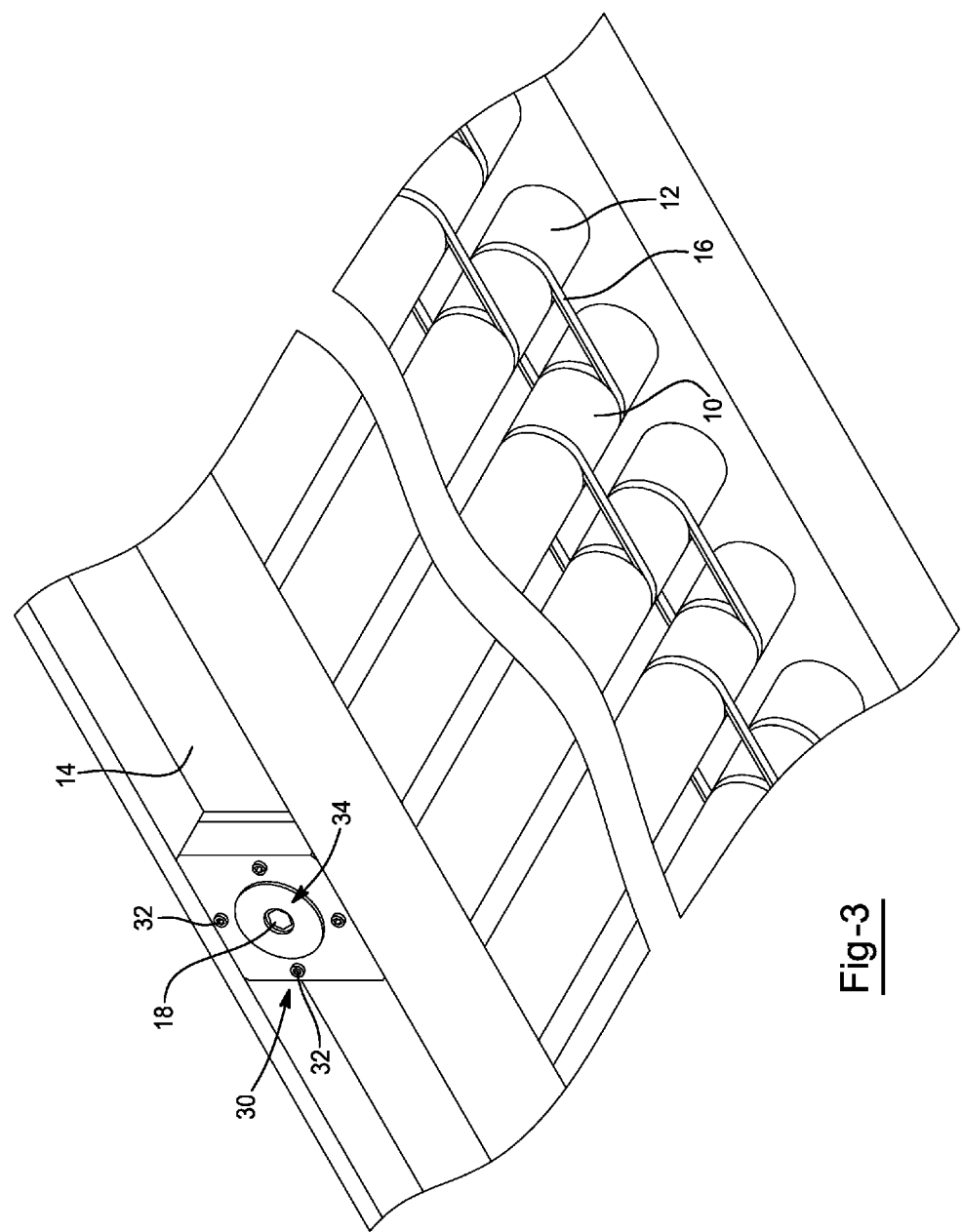

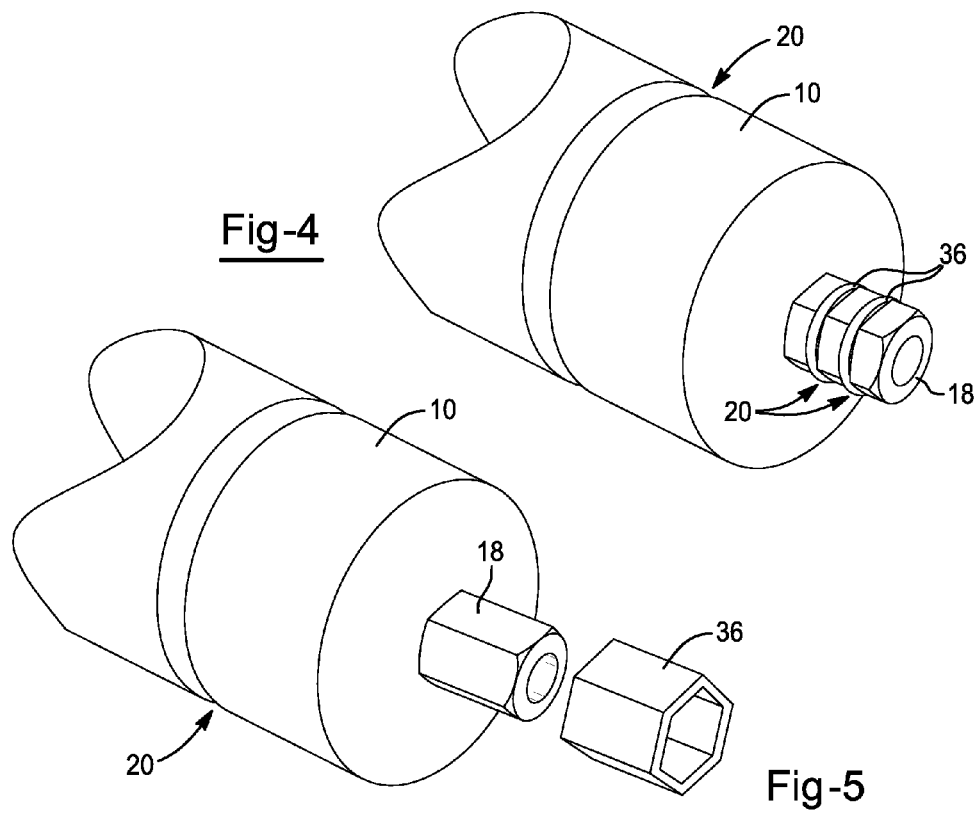
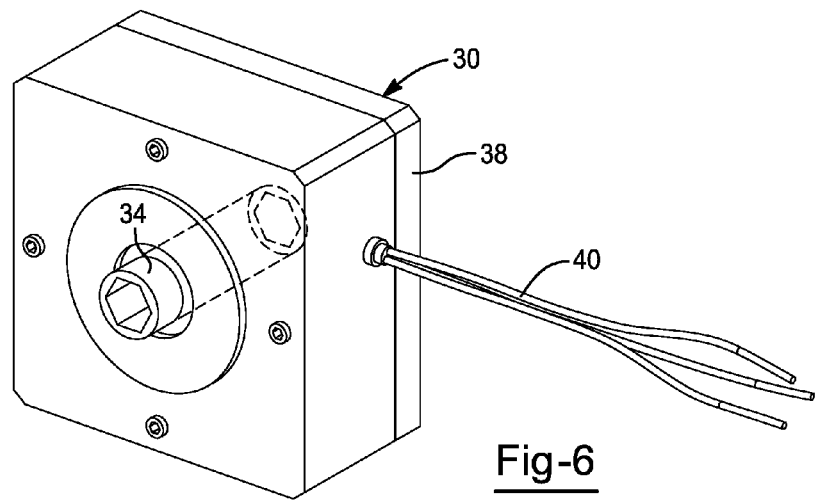

HOLLOW SHAFT DIRECT DRIVE MOTOR

FIELD

The present teachings generally relate to a conveyor system where one or more rollers in the conveyor system are directly driven by a motor.

BACKGROUND

Conveyor systems are used through industry for many reasons such as loading or unloading a truck, moving articles within a machine or factory, or moving articles to a secondary packing location. Conveyor systems typically include a plurality of rollers so that as an article such as a box is placed on the conveyor system the article can be moved without lifting between two locations. Some conveyor systems only include free rolling rollers that allow an article to move using gravity, a push from a user, or another article pushing a first article down the conveyor. Some conveyor systems are motorized so that one or more of the rollers rotate to move an article along the conveyor system. These conveyor systems generally include a motor within one or more of the rollers or a motor that is suspended from the conveyor frame that rotates one or more of the rollers. The one or more rotated rollers may be coupled to other rollers so that multiple rollers are driven by a motor.

Examples of conveyor systems may be found in U.S. Pat. Nos. 3,918,574; 6,206,181; and 7,537,107 all of which are incorporated by reference herein for all purposes. It would be attractive to have a motor that directly drives a roller of the conveyor system. What is needed is a motor that connects directly to the frame and supports one end of a roller (e.g., an end at the drive side of the roller). It would be attractive to have one or more bushings that extends between the motor and a roller shaft so that torque or a force from the motor shaft is applied to the roller shaft through the bushing. What is needed is a motor that directly connects to a frame of the conveyor system and includes a portion that extends through the frame or receives a portion of a roller shaft that extends through the frame.

SUMMARY

The present teachings meet one or more of the present needs by providing: a conveyor system comprising: (a) one or more motors, (b) one or more transfer devices; (c) a plurality or rollers including: (i) one or more master rollers, the one or more master rollers being directly connected to the one or more motors so that the one or more master rollers are directly driven by the one or more motors; and (ii) one or more slave rollers in communication with the one or more master rollers by the one or more transfer devices.

The present teachings meet one or more of the present needs by providing: A conveyor system comprising: (a) one or more motors having a motor shaft; (b) a plurality of rollers including: (i) one or more master rollers having a roller shaft that is in direct communication with the motor shaft so that the one or more motors directly drive the one or more motors; and (ii) one or more slave rollers in communication with the one or more master rollers so that as the one or more master rollers move the one or more slave rollers are moved; and one or more bushings that are located between the motor shaft of the one or more motors and the roller shaft of the one or more master rollers so that the one or more bushings carry a load and prevent direct contact between the motor shaft and the roller shaft.

The present teachings provide a motor that directly drives a roller of the conveyor system. The present teachings provide a motor that connects directly to the frame and supports one end of a roller (e.g., an end at the drive side of the roller). The present teachings provide one or more bushings that extends between the motor and a roller shaft so that torque or a force from the motor shaft is applied to the roller shaft through the bushing. What is needed is a motor that directly connects to a frame of the conveyor system and includes a portion that extends through the frame or receives a portion of a roller shaft that extends through the frame.

BRIEF DESCRIPTION OF THE DRAWINGS

FIG. 3 is close-up view of a motor of FIG. 1;
FIG. 4 is a close-up view of a roller shaft and bushing;
FIG. 5 is a close-up view of a roller shaft and bushing;
FIG. 6 is a perspective view of a motor.

DETAILED DESCRIPTION

Figure 1:
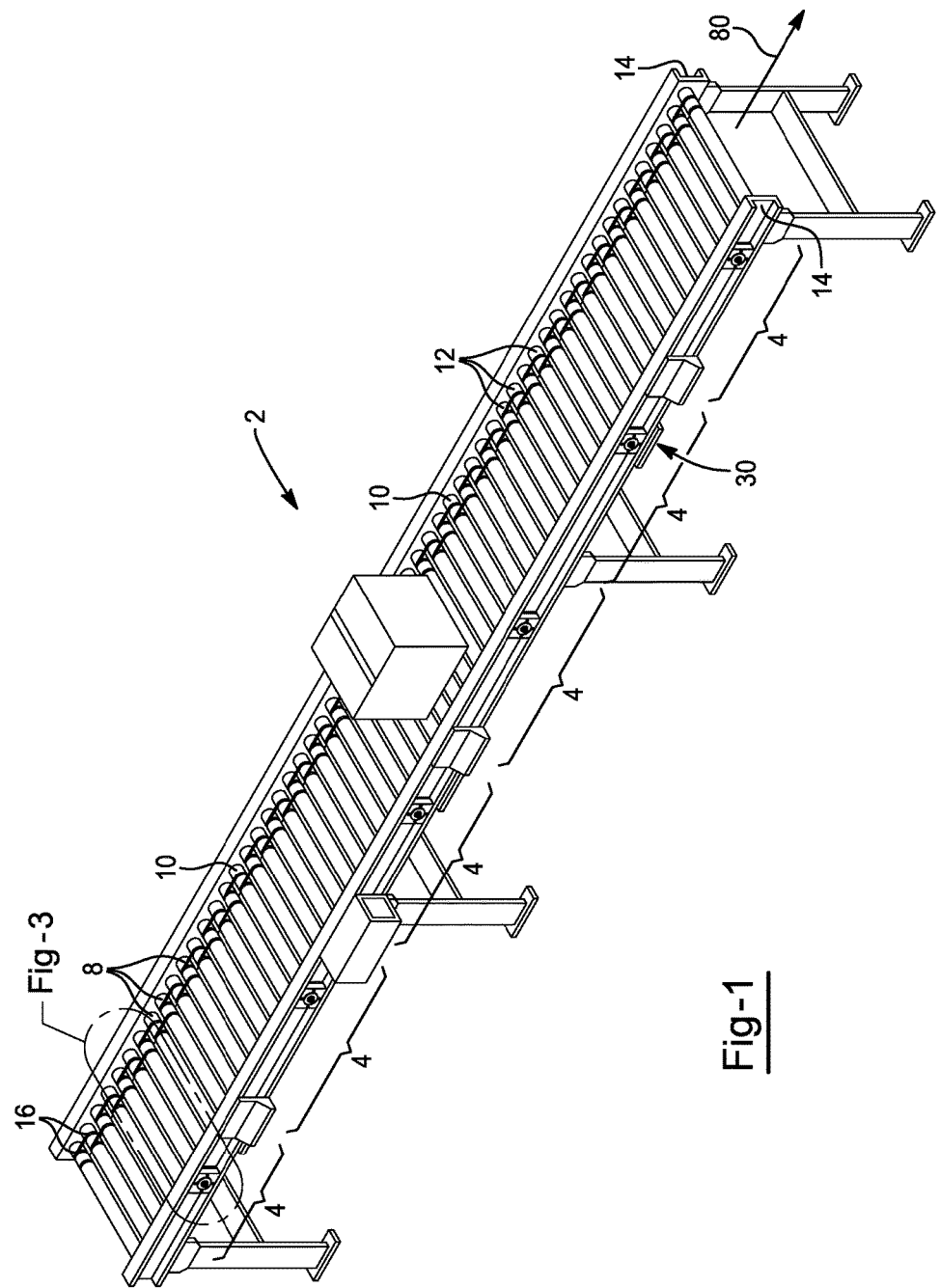
FIG. 1 is a perspective view of a conveyor system that is a roller conveyor.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The conveyor system functions to move articles between two locations. The conveyor system may be move items out of a truck, into a truck, within a factory or warehouse, from machine to machine, or a combination thereof. The conveyor system may have one or more interconnected rollers that are driven by a single motor. Preferably, the conveyor system may include a plurality of rollers that are connected together by one or more transfer devices. The conveyor system may be a roller conveyor, a belt conveyor, or a combination of both. The conveyor system may include one or more roller conveyors.

The one or more roller conveyors may function to directly contact an article so that the article moves along the rollers. The one or more roller conveyors may include one or more master rollers and one or more slave rollers. Preferably, each of the roller conveyors include one master roller and a plurality of slave rollers. The roller conveyors may be one section within a conveyor section. The roller conveyors may be connected by a transfer device that covers a portion of each roller and transfers force, torque, or both from one roller to another roller. The one or more roller conveyors may include one or more transfer devices that are located at a single end of the rollers. The roller conveyors may have exposed rollers versus a belt conveyor that includes a transfer device that substantially covers the rollers.

The one or more belt conveyors may function to move an article along the conveyor system by supporting the article on a transfer device that is supported by the transfer device (e.g., conveyor belt). The one or more belt conveyors may include a single transfer device in each zone that moves articles. The one or more belt conveyors may include one or more master rollers that drive each transfer device. The one or more belt conveyors may carry an article along the transfer device and the transfer device may be supported by one or more rollers (e.g., slave rollers), one or more supports (e.g., a low friction support), or both that are located under the transfer device. The one or more belt conveyors the one or more roller conveyors, or both may include one or more zones.

The one or more zones may operate independently of one another. Each of the zones may include one or more master rollers. Each zone may include a plurality of slave rollers. Each zone may be driven by one or more master rollers that provide power, torque, or both to a plurality of slave rollers via one or more transfer devices. The zones may each be operated at different speeds. The zones may communicate with one another via one or more controllers.

One or more controllers may be located within each zone and each of the one or more controllers may communicate with one another. The one or more controllers may operate each zone. The one or more controllers may communicate from one zone to another zone. The one or more controllers may be located separate from the motor. The one or more controllers may be located within the motor housing. The one or more controllers may be located external of the motor housing, and connected to the motor housing, or not connected to the motor housing. The one or more controllers may be located within an integrated assembly (e.g., a controller housing). The integrated assembly or controller housing may be directly or indirectly connected to the motor housing, the frame, or both. Each controller may control a separate motor but may be in communication with another motor so that each zone is coordinated with the adjacent zones (e.g., zones up stream, downstream, or both of a zone of interest). Each controller may function to control a plurality of rollers. Preferably, each controller may control a motor that is associated with one or more master roller, and the one or more master roller may provide power to one or more slave rollers.

Each zone includes a plurality of rollers. Each of the plurality of rollers spans between two sides of a frame and support articles as the articles are moved along the rollers. The plurality of rollers include one or more master rollers and one or more slave rollers and the master rollers drive one or more of the slave rollers.

The one or more master rollers function to be rotated by a motor, move an article, move one or more slave rollers, or a combination thereof. The one or more master rollers may be directly connected to a motor. Preferably, one motor rotates one master roller. The conveyor system may include a plurality of motors that are each connected to a single master roller. The one or more master rollers may be located within the same plane as the motor, the slave rollers, or both. The one or more master rollers and the one or more slave rollers may all be located in line. The one or more master rollers may directly contact an article moving across the conveyor system. For example, an article may move from the master roller to a slave roller, or may contact the master roller and one or more slave rollers at the same time. The one or more master rollers may be free of any intervening devices between the motor shaft and the roller shaft. The master roller may include a solid roller shaft that extends from a first end of the master roller to a second end of the master roller. The motor shaft may be located at a first end and a second end and may be terminal so that the motor shaft does not extend through a body of the roller. The one or more master rollers may include a roller shaft that extends into the motor shaft or vice versa. The one or more master rollers may be free of any belts extending between the motor and the master roller. The one or more master rollers may be free of any couplings located between the master roller and the motor. The one or more master rollers may be located at an end of the conveyor system, in a middle of the conveyor system, or both. The one or more master rollers may be located between one or more slave rollers. The one or more master rollers may include a plurality of slave rollers on each side (e.g., upstream and downstream). The one or more master rollers may be substantially the same size as the slave rollers. The master rollers may be larger than the slave rollers. The one or more master rollers may be smaller than the one or more slave rollers. The master rollers may have a cross-sectional length (e.g., diameter) that is about 3 mm or more, about 5 mm or more, about 1 cm or more, about 2 cm or more, or even about 5 cm or more. The one or more master rollers may have a cross-sectional length that is about 25 cm or less, about 20 cm or less, or even about 15 cm or less. The one or more master rollers and slave rollers may have a size ratio of about 1:1 or more, about 1.5:1 or more, about 2:1 or more, or even about 3:1 or more. The one or more master rollers may be connected to one or more slaver rollers via one or more transfer devices. The one or more master rollers may directly drive each slave roller via one or more transfer devices. The one or more master rollers may directly drive some slave rollers and indirectly drive some slave rollers vie one or more transfer devices. For example, some slaver rollers may drive other slave rollers by transfer devices extending between two or more slave rollers.

The one or more slave rollers may function to support one or more articles, one or more transfer devices, or both. The one or more slave rollers may assist in moving one or more articles. The one or more slave rollers may surround the master rollers. The one or more slave rollers may be substantially identical to the master rollers. The one or more slave rollers may extend parallel to the master rollers. Each zone may include at least one master roller and a plurality of slave rollers. The slave rollers may be connected to the frame at one or both ends. The one or more slave rollers may be a support.

The one or more supports may function to support a transfer device. Preferably, the support may support a conveyor belt. The support may have a low friction surface and may act as a roller. For example, the support may be located under the transfer device and when contacted by the transfer device may create a low friction contact similar to that of a roller. The one or more supports may have a smooth surface. The support may be made of or include a polymer, metal, polytetrafluorethylene, urethane, nylon, phenolic plastic, adetal, delrin, polyethylene, polyimide, polysulfone, polyphenylene sulfide, or a combination thereof.

The frame functions to support the plurality of rollers so that articles can move along the conveyor system. The frame may be one or more pieces that support one or more ends of the rollers, a motor, a controller, or a combination thereof. The one or more frames may be "L" shaped, "C" shaped, "U" shaped, "I shaped," or a combination thereof. The one or more frames may be two parallel pieces. The one or more frames may connect two or more zones together or extend between two or more zones. The one or more frames may be connected to one or more bearings that support one or more ends of the rollers. The one or more frames may be directly connected to the one or more rollers and the roller shafts may be static relative to the frame and a roller housing may be movable relative to the roller shaft. One or more motors may be directly connected to the frame and the one or more motors may support and an end of the roller relative to the frame. The one or more frames may be made of metal and may support the rollers and articles that move along the frame. The frame may support the rollers so that the rollers rotate as the motor and transfer devices provide power between the plurality of rollers.

The transfer devices may function to provide power from a master roller to one or more slave rollers, from a slave roller to one or more adjacent slave rollers, or both. The one or more transfer devices may connect a motor, a master roller, or both to one or more slave rollers. Preferably, the transfer devices only connect rollers to rollers. For example, the transfer devices may connect a master roller to a slave roller or the transfer device may connect two or more slave rollers together. The transfer devices may be made of or include metal, rubber, fiber, a reinforcement, a natural material, a synthetic material, plastic, a polymer, poly vinyl chloride, urethane, neoprene, nylon, nitrile, polyester, leather, or a combination thereof. The transfer derives may be a chain, a reinforcement coated by rubber, a gear, a toothed member, a belt, or a combination thereof. The transfer device may be one or more flexible couplings.

The one or more flexible couplings may function to connect two or more rollers together in a roller conveyor. The flexible couplings may extend over an end of the rollers. The one or more flexible couplings may sit within a recess in the rollers. The one or more flexible couplings may be located at one end or both ends. The one or more flexible couplings may be a single piece. The one or more flexible couplings may be a plurality of things connected together. The one or more flexible couplings may be a chain with a plurality of links. The one or more flexible couplings may be a polymer or rubber that is an endless piece. The flexible couplings may be a gear that extends from one roller to an adjacent roller to provide power form one roller to another roller. The flexible couplings may be used with a conveyor belt, but preferably when a conveyor belt is used the flexible couplings are not used.

The one or more transfer devices may be a conveyor belt. The one or more conveyor belts function to carry an article above a plurality of rollers. The one or more conveyor belts may be supported on the one or more rollers. The conveyor belts may be driven by one or more master rollers. The conveyor belt may be drive by friction between the conveyor belt and the master roller. The conveyor belts may receive the plurality or rollers so that the plurality of rollers are substantially covered by the conveyor belt. The conveyor belt may extend between two sides of the frame. The conveyor belt may be driven by a master roller. The conveyor belt may be one solid piece that is connected together forming an endless conveyor belt. The conveyor belt may be made of rubber, poly vinyl chloride, urethane, neoprene, nylon, nitrile, polyester, leather or a combination thereof. The conveyor belt may extend over a body of the rollers.

The body of the rollers may be a main part of the roller that carries a load of an article. The body of the roller may be located between the roller shafts. The body of the roller may be hollow. The body of the roller may move when the motor moves a roller shaft. The body of the rollers may move with the roller shaft. The body of the rollers may move independent of the roller shafts.

The one or more roller shafts function to connect the rollers to a frame. The one or more roller shafts may be fixedly connected to the frame. The one or more roller shafts may function to be move relative to the frame. The one or more roller shafts may extend into a motor to support an end of a roller. The one or more roller shafts may be connected to one or more bearings. The one or more roller shafts may be connected to a frame by one or more bearings. The one or more roller shafts may be connected to the body of the roller by one or more bearings. The one or more roller shafts may move with the roller body (i.e., a fixed roller shaft). The one or more roller shafts may move independent of the body of the roller (i.e., a movable roller shaft). The one or more roller shafts may extend cantilever from a body of a roller. The one or more roller shafts may support the roller on the frame. The one or more roller shafts may be solid, hollow, have a smooth exterior, or a combination thereof. The one or more roller shafts may have a cross-sectional shape that is circular, triangle, square, oval, pentagon, hexagon, octagon, heptagon, decagon, nonagon, or a combination thereof.

The one or more roller shafts may function to allow the roller to rotate. The one or more roller shafts may function to carry a load, apply a load to a frame, or a combination thereof. The one or more roller shafts may extend into a bearing, a motor, or both. The one or more roller shafts may have a smooth exterior. The one or more roller shafts may include one or more recesses. The one or more recesses may receive one or more transfer devices. The one or more recesses may receive one or more bushings. The one or more recesses may be sufficiently deep so that the one or more transfer devices, bushings, or both are flush with a body when the transfer devices are located within the recesses. The one or more recesses may receive one or more bushings but the one or more bushings may extend above the rotor shaft, the motor shaft or both so that bushings create an interface between the motor shaft and the rotor shaft. The one or more recesses may assist the transfer devices in rotating the rollers. The one or more recesses may be located proximate to the motor. The one or more motors may be located on an opposite side of the roller as the motor.

The one or more motors may function to move one or more master rollers. The one or more motors may directly drive the one or more master rollers. The one or more motors may be sufficiently large to drive the master roller and one or more slave rollers, preferably four or more slave rollers, more preferably six or more slave rollers, even more preferably eight or more slave rollers, and most preferably ten or more slave rollers. The motor may be an induction motor. The motor may run from alternating current. The motor may run from direct current (DC). The motor may be a brushed motor. The motor may be a brushless motor. Preferably, the motor is a direct current brushless motor (e.g., brushless DC motor). The motor may include a motor shaft, shaft cover, bushing, motor cover, wires, controller, motor stator, magnets, motor rotor, motor hub, motor windings, or a combination thereof. The motor may be free of contact with a gear box. For example, the motor and master roller may be in direct contact without any intervening gear boxes. The frame may dissipate heat generated by the motor. The motor may be in direct contact with the frame and the frame may be a heat sink for the motor. The motor may be connected to the frame by one or more fasteners.

The one or more fasteners may function to connect the motor, a controller, or both directly to the frame. The one or more fasteners may extend through the motor, the controller, or both into the frame. The one or more fasteners may be a bolt, nut and bolt, screw, or a combination thereof. The one or more fasteners may be one or more fasteners, two or more fasteners, three or more fasteners, or four or more fasteners. The one or more fasteners may extend through a motor housing to connect the motor, the controller, or both to the frame. The fasteners may be sufficiently strong so that the motor supports one of the roller shafts. The one or more fasteners may be sufficiently strong to support the motor, one end of a roller shaft, and an article extending across the roller. The roller shaft may be supported by a connection with the motor shaft while the motor is connected to the frame.

The one or more motor shafts may function to rotate the roller shaft. The one or more motor shafts extend from the motor, be located within the motor, or both. The one or more motor shafts may be solid. The one more motor shafts may be hollow. The one or more motor shafts may extend into the roller shaft. The one or more motor shafts may receive the roller shaft. The one or more motor shafts may be connected to a motor rotor, a rotor hub, or both. The one or more motor shafts may provide a force or torque from the motor to the master roller. The motor shaft may extend through the motor so that the roller shaft may be connected to a front side or a rear side of the motor. A hollow motor shaft may extend from a front side to the rear side of the motor so that a shaft can extend all of the way through the motor. The motor shaft may include a shaft cover. The shaft cover may prevent a roller shaft extending through the motor. The shaft cover may plug a hollow motor shaft. The shaft cover may be a rubber plug. The shaft cover may cap a side of the motor. The shaft cover may cover the motor shaft, one or more bushings in the motor, a housing cover, the motor housing, or a combination thereof.

The motor, motor shaft, roller shaft, or a combination thereof may include one or more bushings. The one or more bushings may prevent direct contact between the motor shaft and the roller shaft. The one or more bushings may permit contact between the motor shaft and the roller shaft but may create a flexible barrier between the motor shaft and the roller shaft so that any contact therebetween is dampened. The one or more bushings may be located between the motor shaft and the roller shaft. The one or more bushings may be a ring that extends around a portion of the motor shaft, the roller shaft, or both. The one or more bushings may be cylindrical and extend around all or a portion of the motor shaft, the roller shaft, or both. The one or more bushings may be an O-ring. The one or more bushings may have an open center to receive the motor shaft or the roller shaft. The one or more bushings may extend into a recess in the motor shaft, the roller shaft, or both. The one or more bushings may be free of extension into a recess. The one or more bushings may extend over the recesses. The one or more bushings may fit partially into a recess so that a portion of the bushings are located within the recess and a portion of the bushings are located above the recess. The motor, motor shaft, roller shaft, or a combination thereof may include one or more, two or more, three or more, or even four or more bushings. The bushing may be complementary in shape to the motor shaft, the roller shaft, or both. For example, if the roller shaft as an exterior shape that is a hexagon and the interior of the interior shape is a hexagon then the bushing will have a hexagon shape to fit over the roller shaft and inside of the motor shaft. The one or more bushings may be made of or include a natural material, a synthetic material, rubber, elastomer, polymer, nitrile rubber, vulcanized rubber, polytetrafluoroethylene, or a combination thereof. The one or more bushings may be located inside of the motor cover when the roller shaft and the motor shaft are connected.

The motor cover may cover one or both sides of the motor. The motor cover may function to cover the motor, a controller, or both. The motor cover may seal the motor. The motor cover may seal the motor housing. The motor cover may be part of the motor housing. The motor cover may connect to the motor housing, a frame, or both. The motor cover may receive one or more wires so that the motor, the controller, or both are powered, receive signals, or both.

The one or more wires function to provide power, signal, or both to and/or from the controller, the motor, or both. The wires may connect the motor, the controller, or both to a power source. The wires may connect the motor, the controller, or both to one or more sensors. The one or more wires may have a sufficient gauge to carry power, signals, or both to the motor, the controller, or both, or between the controller and the motor. The motor is connected to at least 2 wires (a positive and a negative). The motor may be connected to a signal wire. The controller may be connected to 2 or more wires and three or more wires. For example, the controller may be connected to a positive, a negative, and a signal wire. The one or more wires may directly power the controller, the motor, or both. Preferably, the wires are connected to the controller and extend from the controller to the motor.

The one or more controllers function to control the motor, a master roller, a zone, the conveyor system, or a combination thereof. The one or more controllers may be located proximate to the motor. The one or more controllers may be located in a central location. The one or more controllers may be located inside of the motor or the motor housing. The one or more controllers may be connected to the motor housing. The one or more controllers may be connected between the frame and the motor housing, the motor, or both. The one or more controllers may control a motor rotor, a power source, or both. The one or more controllers may be located outside of the motor stator.

The motor stator may function to move a rotor. The motor stator may include one or more magnets, one or more motor windings, or both. The motor stator may be powered to move the motor rotor. The motor stator may be free of contact with the magnets, the rotor, or both. The motor stator may assist in moving a motor shaft so that the motor rotates a master roller. The motor state may extend around the motor rotor, a plurality of magnets, or both.

The one or more of magnets may function to rotate the rotor when the motor windings are powered. The one or more magnets may be a solid permanent ring magnet. The one or more magnets may be a plurality of magnets. The plurality of magnets may extend around an outside of the motor rotor. The motor may include an even number of magnets. The motor may include an odd number of magnets. The plurality of magnets may be 2 or more, 4 or more, 6 or more, 8 or more, 10, or more, 12 or more, 14 or more, 16 or more, 18 or more, or even 20 or more magnets. The plurality of magnets may be about 50 or less, 40 or less, or 30 or less magnets. The magnets may be made of or include a ferrous metal, neodymium, iron, boron, samarium, cobalt, rare earth metals, Alnico, ceramic, ferrite, manganese, magnetite, iron, nickel, iron oxide, cerium, dysprosium, erbium, europium, gadolinium, holmium, lanthanum, lutetium, praseodymium, promethium, scandium, terbium, thulium, ytterbium, yttrium, or a combination thereof. The one or more magnets may be connected to the motor rotor.

The motor rotor may function to move the motor shaft. The motor rotor may be connected to the motor shaft. The rotor may include an equal number of magnet housings for each magnets. The rotor may be rotated by the magnets when the motor windings are powered. The rotor may include a rotor hub that is directly connected to the motor shaft.

The rotor hub may be connected to the motor shaft and may rotate upon activation of the motor windings. The rotor hub may be surrounded by the motor stator, the motor windings, or both. The rotor hub may have a hollow motor shaft that is a through hole through the rotor hub. The rotor hub may house a solid motor shaft. The rotor hub may be rotated when the motor windings are activated.

The one or more motor windings function to rotate the rotor when the motor windings are powered. The one or more motor windings may move the magnets when the motor windings are powered. The motor may include a plurality of motor windings. The motor windings may be complementary to the magnets. The motor may include one or more motor windings than magnets. The motor may include an odd number of motor windings. The motor may include 2 or more, 4 or more, 6 or more, 8 or more, 10, or more, 12 or more, 14 or more, 16 or more, 18 or more, or even 20 or more motor windings. The plurality of motor windings may be about 50 or less, 40 or less, or 30 or less motor windings. Preferably, the motor includes 21 motor windings that are located proximate to 20 motors. The motor windings may be located inward of the magnets (i.e., the magnets may extend around the motor windings). The motor windings may extend around the magnets (e.g., outside). The motor windings may be located within the motor housing.

The motor housing functions to protect the rotor, stator, controller, or a combination thereof. The motor housing functions to connect the motor to the frame, the roller shaft, or both. The motor housing may be a geometric shape. The motor housing may be round, square, square without corners, rectangular, have one or more flat walls, or a combination thereof. The motor housing may have an empty center that receives the motor, the motor rotor, the motor stator, or a combination thereof. The motor housing may include one or more through holes or cavities that receive one or more fasteners that connect the motor housing to the frame. The motor housing may be connected to the frame on a drive side, a ride side, or both of the frame.

The drive side may be the side of the conveyor system where the motor is connected. The ride side may be an opposite side of the conveyor system as the motor. The ride side may be free of a motor. The drive side may include one or more through holes in the frame that the roller shaft extends through to connect to the motor. The ride side may have the roller shaft connected to the fame. The ride side may have a bearing that connects the roller shaft to the frame. The ride side may have a roller shaft that rolls. The ride side may have a roller shaft that is static. The drive side has a roller shaft that moves.

The one or more bearings may function to support the motor shaft as the motor shaft is rotated. The one or more bearings may axially support the motor shaft and the roller shaft, once the roller shaft is located within the motor shaft. The one or more bearings may connect the motor shaft to the frame. The one or more bearings may be connected to the frame on the ride side. The one or more bearings may be free of contact with the frame on the drive side. The one or more bearings may allow the rollers to rotate about an axis. The one or more bearings may be located within a body of the roller. The one or more bearings may extend between the body of the roller and the roller shaft. The one or more bearings may be a flange bearing. The bearing may be located within a housing that includes one or more flanges. The one or more flanges may function to connect the bearing to the frame. The one or more flanges may support the bearing on the frame but allow for some movement of the bearing relative to the frame, the flanges, or both. The one or more flanges of the flange bearing may receive one or more fasteners for connecting the bearing to the frame. The one or more bearings may be flexible. The one or more bearings may be flexible so that the roller shaft may not be perpendicular to the frame on the drive side and/or the ride side. The one or more bearings may include a flexible sleeve that permits movement of the roller shaft.

The one or more flexible sleeves may function to permit movement of the bearing, the roller shaft, or both relative to each other. The one or more flexible sleeves may be a plurality of flexible sleeves. The one or more flexible sleeves may be located between the bearing and the roller shaft. The one or more flexible sleeves may be located between an outer ring of the bearing and the bearing housing. The one or more flexible sleeves may be located between the outer ring of the bearing and the body of the roller. The one or more flexible sleeves may permit the roller shaft to move about 1 degree or more, about 2 degrees or more, about 5 degrees or more. The one or more flexible sleeves may permit the roller shaft to extend between the frames when the connection points (e.g., bearing, hole in frame, motor shaft) are not collinear. The flexible sleeve may assist in centering the roller shaft when the drive side and the ride side are not parallel to each other, when the center of the bearings and a central axis of the roller shaft are not collinear, when the center of the bearings and a central axis of the roller shaft are not concentric. The flexible sleeves may allow a center of the bearing to move without affecting the ability of the bearing to rotate. The bearing may be a spherical plain bearing. The bearing may have a ball and socket arrangement so that an inner race can move relative to an outer race. The bearing may permit angular rotation about a central axis point in one or more orthogonal directions or two or more orthogonal directions. The flexible sleeve may be made of or include metal, rubber, fiber, a natural material, a synthetic material, plastic, a polymer, poly vinyl chloride, urethane, neoprene, nylon, nitrile, polyester, leather. or a combination thereof. The one or more flexible sleeves may function to rotate in an upstream direction (e.g., in the forward direction) or a downstream direction (e.g., in the rearward direction). The one or more flexible sleeves may be used with or in lieu of a frame with adjustable portions.

The adjustable portions may function to permit movement of a roller shaft, the motor shaft, bearings, or a combination thereof so that the rollers may be adjusted to be substantially parallel with both side of the frame. The adjustable portions may be a through hole in the frame that permits movement of the motor shaft, the bearings, or both along the machine direction. The adjustable portions may be an oblong hole in the frame. The adjustable portions may allow the bearings to slide along the frame when the fasteners are loosened. The adjustable portions may be oval.

FIG. 1 illustrates a conveyor system 2 including a plurality of rollers 8 located between two frame members 14. The rollers 8 include master rollers 10 directly connected to a motor 30 and slave rollers 12 that are driven by the master rollers 10. The conveyor system 2 includes a plurality of zones 4 with a master roller 10 in the center of each zone 4 so that slave rollers 12 are located on each side of the mater rollers 10. The master rollers 10 move the slave rollers 12 in the direction 80 via one or more transfer devices 16.

Figure 2:
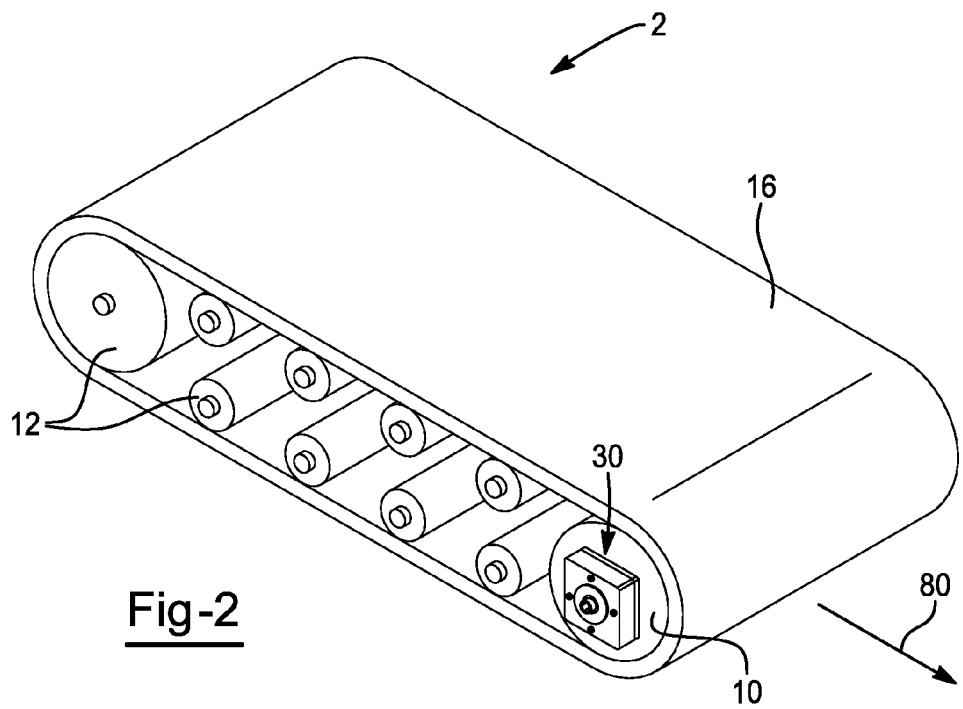
FIG. 2 is a top perspective view of a conveyor system that is a belt conveyor.

FIG. 2 illustrates a conveyor system 2 with a plurality of rollers 8. The plurality of rollers include a master roller 10 and slave rollers 12 that support a transfer device 16 that wraps all of the rollers 8. The master roller 10 is directly connected to the motor 30 so that the motor directly drives the master roller 10 and the master roller 10 drives the slave rollers 12 in the direction 80 via the transfer device 16.

FIG. 3 illustrates a close up view of the motor 30 connected to a frame 14. The frame 14 includes two sides that the master roller 10 and the slave roller 12 span between. The master roller 10 is directly driven by the motor 30 and the slave rollers 12 are driven transfer devices 16 that extend between the master roller 10 and the slave rollers 12 and between the slave rollers 12. The motor 30 includes a plurality of fasteners 32 that connect the motor 30 to the frame 14. The motor also includes a motor shaft 34, which as shown is hollow to receive the roller shaft 18 of the master roller 10.

Figure 3A:
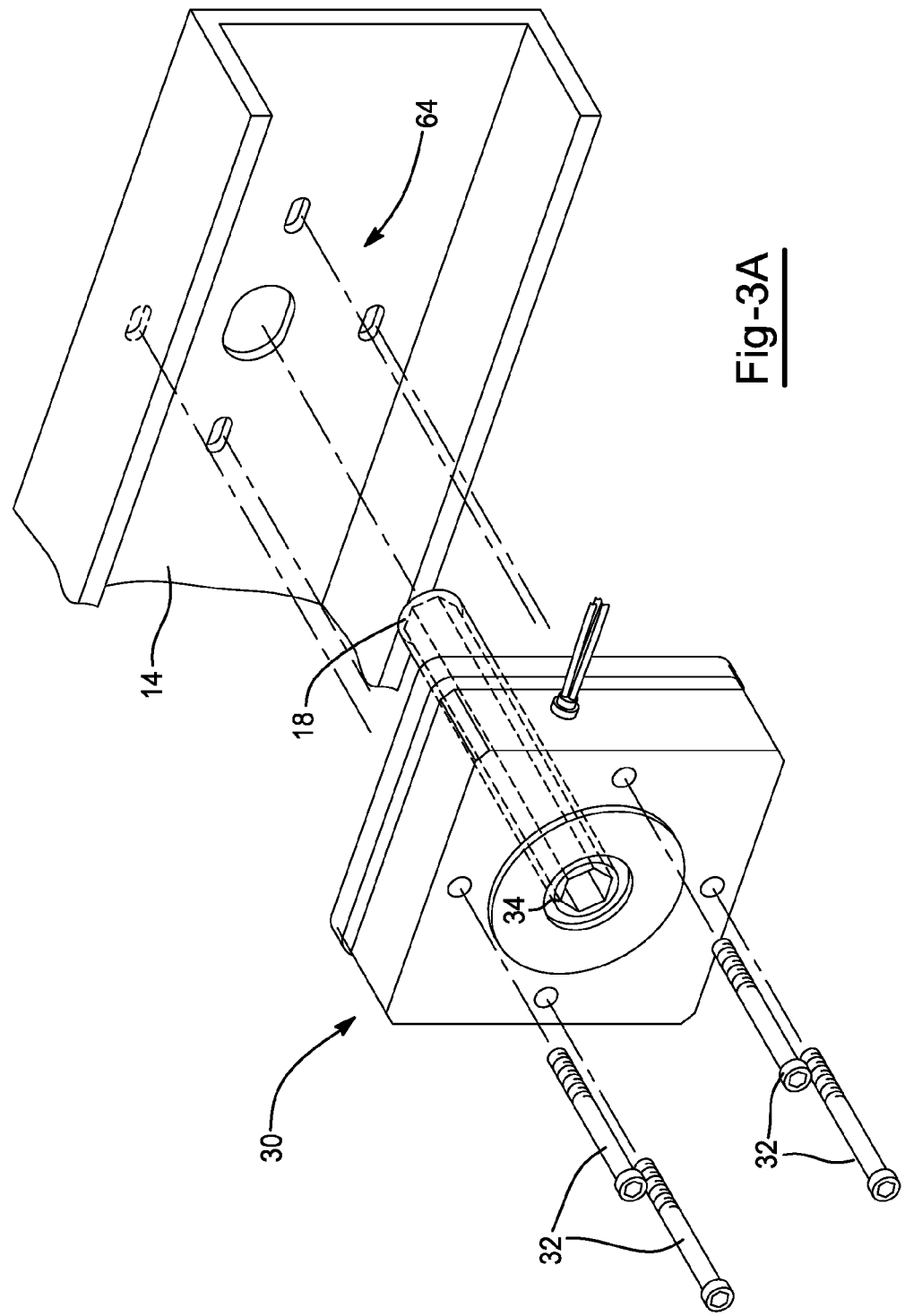
FIG. 3A is an exploded view of the motor and frame connection of FIG. 3.

FIG. 3A is an exploded view of the connection between the motor 30 and frame 14 of FIG. 3. The frame 14 includes an adjustable portion 64 so that the motor and fasteners 32 can be moved to align the motor shaft 34 with the with the roller shaft 18 and so that a drive side and a ride side of a roller (not shown) are aligned with the frame 14. The fasteners 32 extend through the motor 30 and connect the motor 30 to the frame 14.

FIG. 4 is a close-up view of a master roller 10 with a roller shaft 18. The roller shaft 18 includes a plurality of recesses 20. Some of the recesses 20 are shown receiving a bushing 36. Some of the recesses 20 are configured to receive a transfer device (not shown). When the roller shaft 18 is installed within the motor shaft (not shown), the bushing acts as an interface between the motor shaft (not shown) and the roller shaft 18.

FIG. 5 illustrates a close-up view of a master roller 10 with a roller shaft 18. The roller shaft 18 is substantially smooth and has a plurality of sides. A bushing 36 extends over the roller shaft 18 and between the roller shaft 18 and the motor shaft (not shown) so that the bushing 36 acts as an interface. The master roller 10 also includes a recess 20 for receiving a transfer device (not shown).

FIG. 6 illustrates the motor 30 having a motor shaft 34 that extends all of the way through the motor 30. A rear side of the motor 30 includes a motor cover 38. The motor 30 includes a plurality of wires 40 that power the motor 30.

Figure 7:
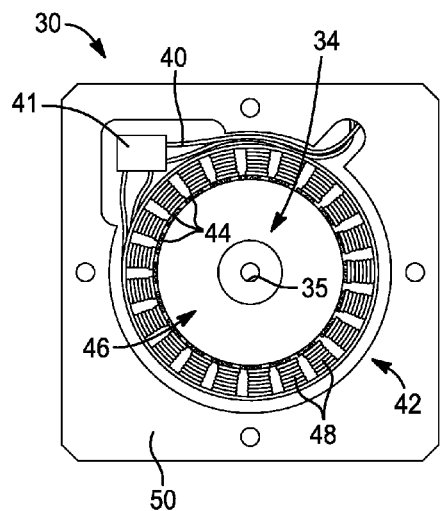
FIG. 7 illustrates internal components of a motor.

FIG. 7 illustrates the motor 30 with the motor cover (not shown) removed. The motor 30 includes a motor stator 42 within a motor housing 50, including a plurality of motor windings 48 and a motor rotor 46 including a plurality of magnets 44. A plurality of wires 40 provide power to the motor windings 48 to drive the motor rotor 46 and the motor shaft 34 connected to the motor rotor 46. The motor shaft 34 is capped by a shaft cover 35. The plurality of wires 40 are also connected to a controller 41 that controls the motor 30.

Figure 8:
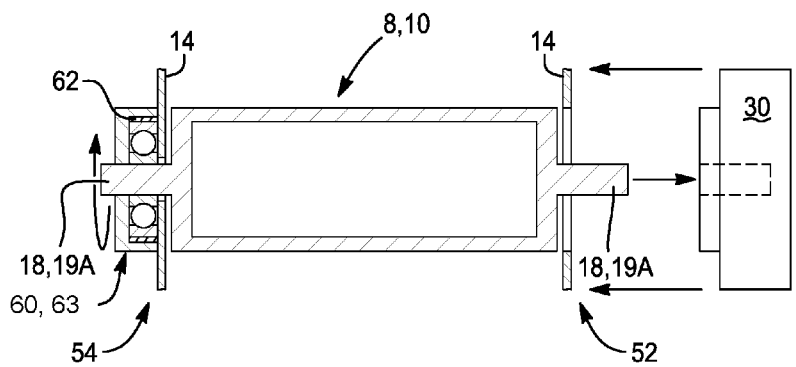
FIG. 8 is a partially exploded view of a motor and roller.

FIG. 8 illustrates a partially exploded view of a roller 8 (shown as a master roller 10) and motor 30. The motor 30 is located on the drive side 52 of the roller 8. The motor 30 is connected to the frame 14 and extends over a roller shaft 18, which is a fixed roller shaft 19A that moves with the roller 8. The ride side 54 (or non-driven side) of the roller 8 includes a roller shaft 18 that is a fixed roller shaft 19A. The roller shaft 18 extends through the frame 14 and into a bearing 60 that connects the roller shaft 18 to the frame 14 so that the roller shaft 18 and the roller 8 can move together. The bearing 60 includes a flexible sleeve 62 extending between the roller shaft 18 and the bearing housing that permits the roller shaft 18 to mover relative to the frame 14 in the event that the bearing 60 on the drive side 52 and the bearing 60 on the ride side 54 are not concentric (e.g., the center of the bearings and the central axis of the roller do not form a collinear line having a substantially right angle with the frame on the ride side and the frame on the drive side). The bearing 60 on the ride side is shown as a flange bearing 63.

Figure 9:
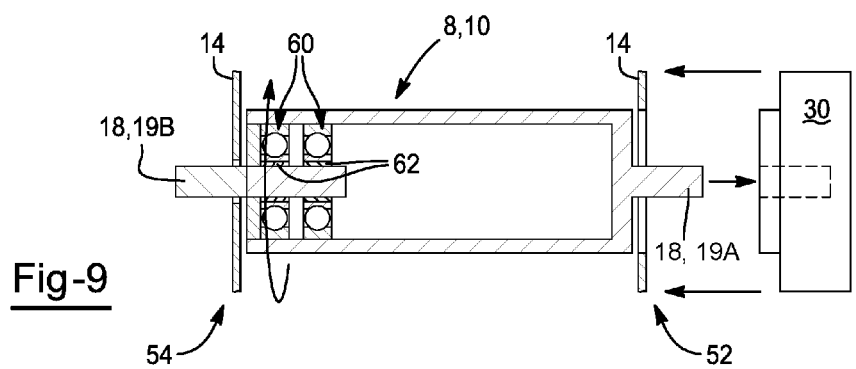
FIG. 9 is a partially exploded view of a motor and roller, and the internal roller components are shown.

FIG. 9 illustrates a partially exploded view of a roller 8 (shown as a master roller 10) and motor 30. The motor 30 is located on the drive side 52 of the roller 8. The motor 30 is connected to the frame 14 and extends over a roller shaft 18, which is a fixed roller shaft 19A that moves with the roller 8. The ride side 54 (or non-driven side) of the roller 8 includes a roller shaft 18 that is a movable roller shaft 19B. The roller shaft 18 extends through and is connected to the frame 14 and a pair of bearing 60 are located within the roller 8 and connected to the roller shaft 18 so that the roller shaft 18 remains static and the roller 8 rotates above the movable roller shaft 19B. The bearings 60 includes a flexible sleeve 62 extending between the roller shaft 18 (however, the flexible sleeve may be located between the bearing and the roller 8) and the bearing 60 that permits the bearing 60 and shaft 18 to mover relative to each other in the event that the bearing 60 on the drive side 52 and the bearing 60 on the ride side 54 are not concentric (e.g., the center of the bearings and the central axis of the roller do not form a collinear line having a substantially right angle with the frame on the ride side and the frame on the drive side).

Figure 10:
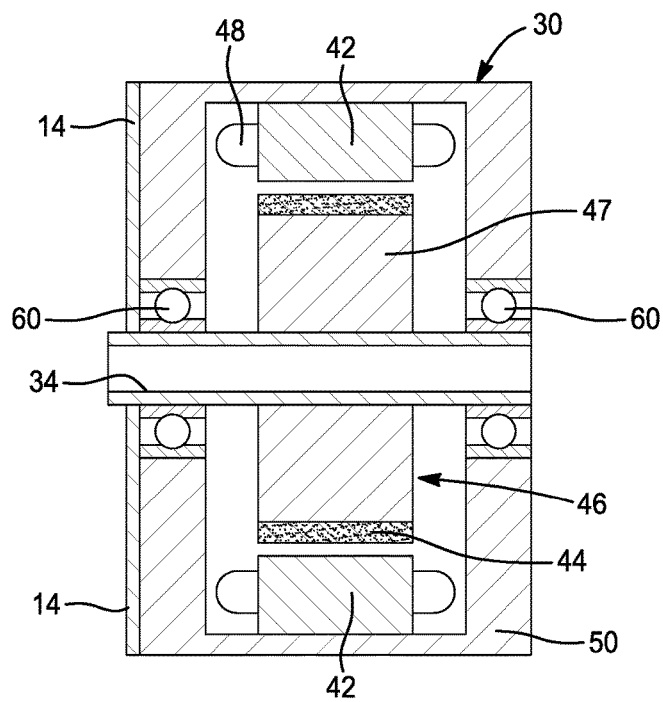
FIG. 10 is a cross-sectional view of a motor.

FIG. 10 illustrates a cross-sectional view of a motor 30. The motor 30 includes a motor housing 50 that connects the motor 30 to the frame 14. A motor shaft 34 extends through a center of the motor 30 and is exposed on both ends through the motor housing 50. A bearing 60 is connected at each end of the motor shaft 34 and to the motor housing 50. The motor shaft 34 is connected to a motor rotor 46 via a motor hub 47 that includes one or more magnets 44 (e.g., permanent magnets). The magnets 44 are located across from the motor stator 42 that includes one or more motor windings 48 and preferably a plurality of motor windings 48.

Figure 11:
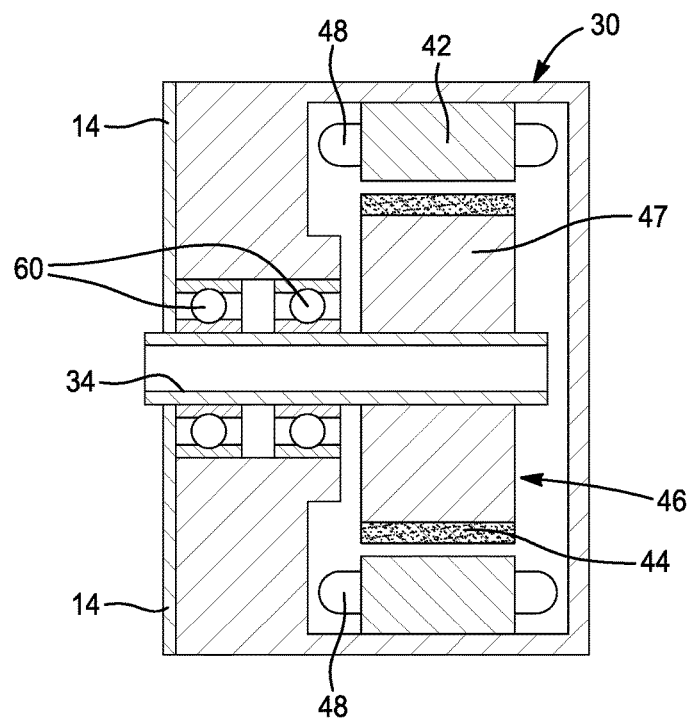
FIG. 11 is a cross-sectional view of a motor.

FIG. 11 illustrates a cross-sectional view of a motor 30. The motor 30 includes a motor housing 50 that connects the motor 30 to the frame 14. A motor shaft 34 extends through a center of the motor 30 and is exposed on one end through the motor housing 50. A pair of bearings 60 is connected at one end of the motor shaft 34 and to the motor housing 50. The motor shaft 34 is connected to a motor rotor 46 via a motor hub 47 that includes one or more magnets 44 (e.g., permanent magnets). The magnets 44 are located across from the motor stator 42 that includes one or more motor windings 48 and preferably a plurality of motor windings 48.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A conveyor system comprising:
   a. one or more motors having a motor shaft,
   b. one or more transfer devices;
   c. a plurality or rollers each having a roller shaft, the plurality of rollers including:
      i. one or more master rollers, the one or more master rollers being directly connected to the one or more motors so that the one or more master rollers are directly driven by the one or more motors; and
      ii. one or more slave rollers in communication with the one or more master rollers by the one or more transfer devices,
   wherein the motor shaft is a hollow motor shaft and the roller shaft extends into the hollow motor shaft or the roller shaft is a hollow roller shaft and the motor shaft extends into the hollow roller shaft, and the motor shaft of the one or more motors is in direct communication with the roller shaft of the one or more master rollers.

2. The conveyor system of claim 1, wherein the one or more motors are a brushless direct current motor.

3. The conveyor system of claim 1, wherein the conveyor system includes a frame and the motor directly supports a drive side of the roller shaft of the one or more master rollers.

4. The conveyor system of claim 1, wherein the one or more transfer devices is a conveyor belt that extends over the plurality of rollers, one or more supports, or both so that the plurality of rollers, the one or more supports, or both are located inside of the conveyor belt.

5. The conveyor system of claim 4, wherein the one or more master rollers have a diameter that is greater than a diameter of the one or more slave rollers.

6. The conveyor system of claim 1, wherein the one or more master rollers drive the one or more transfer devices and the one or more slave rollers support the one or more transfer devices.

7. The conveyor system of claim 1, wherein the conveyor system has a plurality of zones and each of the plurality of zones includes at least one of the one or more master rollers and each of the plurality of zones includes at least one of the one or more slave rollers.

8. The conveyor system of claim 7, wherein the at least one of the one or more master rollers is located between two or more slave rollers.

9. The conveyor system of claim 7, wherein each zone includes only one of the one or more master rollers and a plurality of the one or more slave rollers and some of the plurality of slave rollers are located up stream of the only one of the one or more master roller and some of the plurality of slave rollers are located downstream of the only one of the one or more master rollers.

10. The conveyor system of claim 1, wherein the one or more transfer devices is a flexible coupling that extends over a portion of the plurality of rollers.

11. The conveyor system of claim 1, wherein the one or more motors are connected to a frame of the conveyor system and the motor shaft, the roller shaft, or both extend through the frame so that the one or more motors and the one or more master rollers are directly connected.

12. The conveyor system of claim 1, wherein the one or more motors include a motor rotor, a motor stator, and two or more bushings, and the motor rotor and the motor stator are located between the two or more bushings or the two or more bushings are located on a first side or a second side of the motor rotor and the motor stator.

13. The conveyor system of claim 1, wherein the one or more motors include a housing and a controller is located within the housing, outside the housing and connected to the housing, as an integrated assembly that is connected to the housing, or a combination thereof.

14. The conveyor system of claim 1, wherein the roller shaft or the motor shaft includes a plurality of recesses that each receive a bushing, and the bushings interface between the roller shaft and the motor shaft.

15. The conveyor system of claim 1, wherein a bushing extends over the roller shaft or the motor shaft, and the bushing interfaces between the roller shaft and the motor shaft.

16. A conveyor system comprising:
   a. one or more motors having a motor shaft;
   b. a plurality of rollers including:

i. one or more master rollers having a roller shaft that is in direct communication and coaxial with the motor shaft so that the one or more motors directly drive the one or more master rollers; and ii. one or more slave rollers in communication with the one or more master rollers so that as the one or more master rollers move the one or more slave rollers are moved; and c. one or more bushings that are located between the motor shaft of the one or more motors and the roller shaft of the one or more master rollers so that the one or more bushings carry a load and prevent direct contact between the motor shaft and the roller shaft.

17. The conveyor system of claim 16, wherein the one or more bushings are a singular sleeve that extends over the motor shaft, over the roller shaft, or both.

18. The conveyor system of claim 16, wherein the motor shaft receives the roller shaft or the roller shaft receives the motor shaft and the one or more bearings are located between the roller shaft and the motor shaft.

19. The conveyor system of claim 16, wherein the roller shaft includes one or more recesses and each of the one or more recesses receives at least one of the one or more bushings.

20. The conveyor system of claim 19, wherein the one or more bushings have a cross-sectional length that is greater than a depth of the one or more recesses so that each of the one or more bushings extend out of the one or more recesses and above an outside of the roller shaft.

* * * * *